July 17, 1962　　M. J. SIEGEL　　3,044,743
VALVE CONSTRUCTION
Filed Oct. 2, 1958
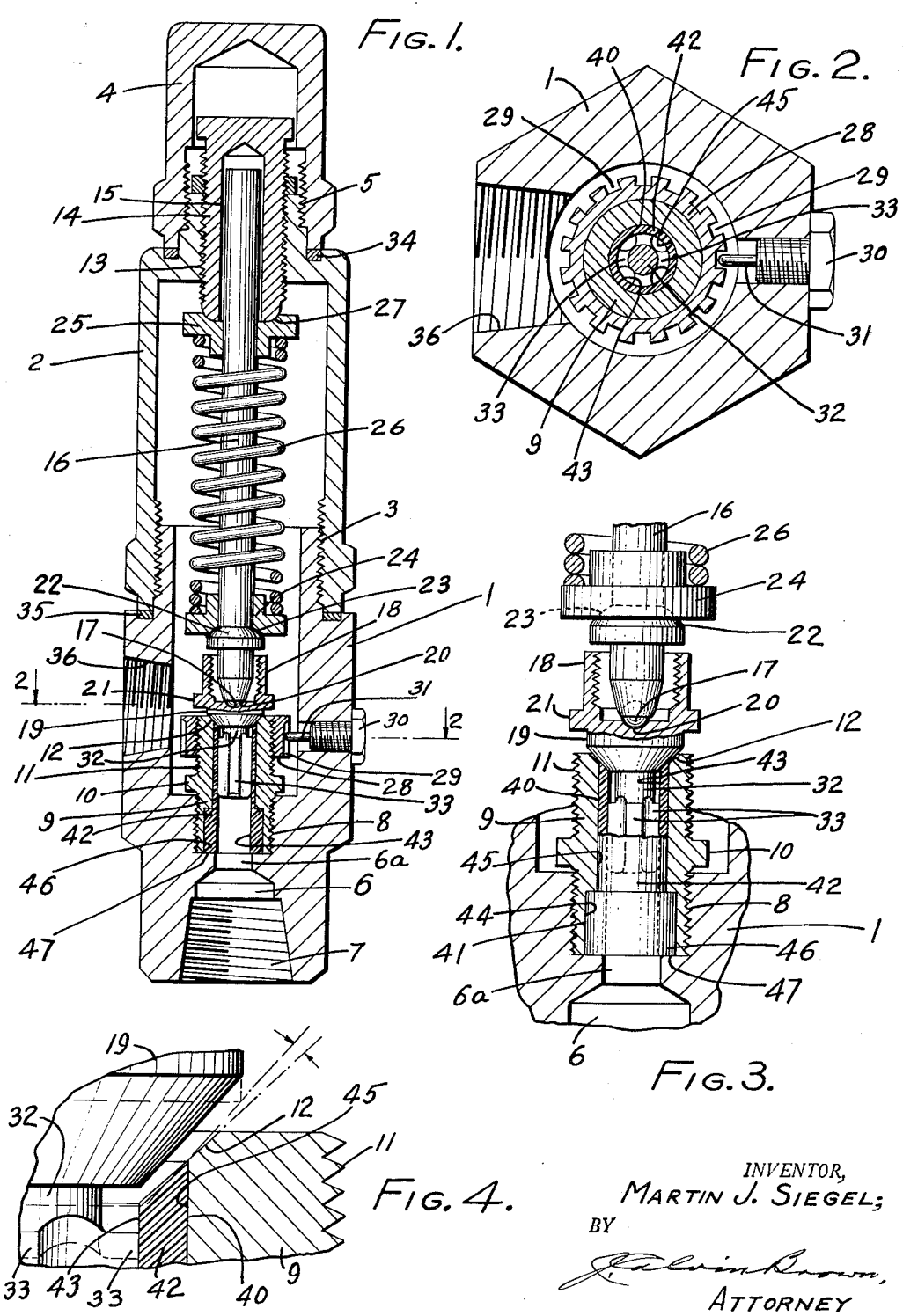
INVENTOR,
MARTIN J. SIEGEL;
BY
ATTORNEY 3,044,743
VALVE CONSTRUCTION
Martin J. Siegel, Los Angeles, Calif., assignor to W. R. Ladewig Company, Los Angeles, Calif., a copartnership
Filed Oct. 2, 1958, Ser. No. 764,835
4 Claims. (Cl. 251—332)

The present invention relates broadly to valves, and more specifically to a valve structure adapted to prevent valve seat leakage, while at the same time maintaining proper performance and operation of the valve.

One of the main difficulties in valves, whether controlling the passage of a gas or a liquid, is the leakage factor at the valve seat. Specifications require a high degree of tightness between the valve and its seat which necessitates a great deal of hand lapping of the seat to reduce leakage past the seat to a required minimum value. Certain valves, particularly of the bottom guided type which employ a wing type guide movable in the bore of a valve seat bushing, are troubled with galling and wear which limits the life of the valve and interferes materially with its proper operation.

It is common practice in the art to provide a threaded connection between the valve seat bushing and the body of the valve, and such a construction requires the use of a thread sealant, otherwise leakage will occur along the threaded area. However, such a sealant is difficult to apply and has been found undependable in preventing leakage and is also troublesome in that if leakage occurs the valve must be dismantled for the reapplication of the sealant to the threads.

With my construction I have overcome the difficulties just mentioned, while at the same time obtaining proper operation of the valve.

An object of my invention is to provide a construction wherein a proper seal is provided between the bushing and the body other than by the use of a sealant.

A further object is to provide a valve structure which is substantially free from galling and wherein wear is reduced in the bore of the valve seat bushing.

A further object is to provide a valve structure wherein, as the valve closes, a sealing of the valve first occurs followed by a seating of the valve against a hardened seat.

With reference to the foregoing objects, I have provided an insert or liner for the valve seat bushing so constructed and arranged and carried within the bushing that when the valve, which may be formed of steel, moves toward seating position, the said valve first has contact with the relatively soft insert or liner followed by contact with the seat of the valve seat bushing. The sealing engagement of the valve with the insert or liner is accomplished under a small spring load, with a major spring load carried by the bushing seat with the result that proper and consistent functioning of the valve is obtained. My valve construction is such that the relatively soft insert or liner for the bushing seals the base of the bushing where it contacts the valve body to prevent any leakage of fluids at this zone. This latter function of the liner renders the necessity of using sealants for the threaded connection between the bushing and the body unnecessary as the liner effectively seals against any leakage at this zone.

Other objects include a valve structure which is simple of construction, easily replaced, inexpensive in cost of manufacture and superior to valve structures now known to the inventor.

With the above mentioned, and other objects in view, the invention consists in, the novel, and useful provision, construction, association, and relative arrangement of parts, members, and features, all as shown in one embodiment in the accompanying drawings, described generally, and more particularly pointed out in the claims.

In the drawing:

FIGURE 1 is a vertical sectional view of a valve, incorporating the invention;

FIGURE 2 is a sectional view on the line 2—2 of FIGURE 1 and on an enlarged scale;

FIGURE 3 is an enlarged fragmentary sectional detail of certain portions of the valve structure; and FIGURE 4 is a fragmentary sectional view on an enlarged scale showing a portion of the valve and its seat.

Referring now to the drawing.

In FIGURE 1, I have detailed a spring loaded valve structure, by way of illustration only, as the invention may be applied to any type of valve within the principles of my invention. In the present valve structure which will be briefly detailed, I provide a body 1, a bonnet 2 screw-threaded to the body at 3 and a cap 4 threaded at 5 to the bonnet 2. The body 1 has an inlet port 6 which is usually threaded at 7, with the body formed with a communicating threaded bore 8, for the reception therein of a threaded bushing 9. The bushing is provided with an external, hexagonal flange 10 and is externally threaded above said flange at 11. This bushing is termed the valve seat bushing for the reason that it is provided with a seat at 12. As a rule the bushing is of hardened metal and usually formed of steel.

The bonnet 2 is provided with an axial bore, the surrounding wall of which is screw threaded as shown at 13, and secured to the threads 13 is an adjusting screw 14 formed with an axial bore 15. The adjusting screw is adapted to receive within the bore 15 thereof a portion of an elongated valve stem 16. The opposite end of the valve stem 16 is rounded at 17, which end is received within a cup like structure 18 formed on valve 19, valve 19 engaging the seat 12. The construction is such that the rounded end 17, seats within a circular socket 20, for the purpose of maintaining alignment of the valve relative to its seat. A surrounding annular flange 21, on the valve forms a part of the valve structure.

Inward from the rounded end 17 and carried by the stem 16 is an annular flange 22 having a spherical top surface 23 which engages and supports a socketed washer 24 also carried on the stem 16. A second washer 25 is carried on the stem 16 and between the said washers 24 and 25 and surrounding the stem is a helical spring 26. The washer 25 is socketed at 27 for receiving the curved end of screw 14. It is obvious that by adjusting the position of the screw 14 relative to the bonnet 2 that spring compression is regulated and whereby the spring pressure between the valve and its seat is likewise regulated.

Carried on the threads 11, for axial adjustment, is a blow-down ring 28. This blow-down ring accomplishes the usual function of regulating the spacing between the flange 21 and the top of the ring 28 and as shown in FIGURE 1. The blow-down ring has a castellated portion 29 for regulating the position of the ring. A lock screw 30 is tapped into the side of the body and carries a pin 31 for reception between selected castellations 29 to hold the ring in a desired position relative to the flange 21.

As best shown in FIGURE 3, it is customary in valve structures of the type just described to provide the valve with a depending stem at 32 formed with one or more wings 33, between which wings gas or liquid may pass and which wings act as guides within the bore of the bushing 9 during opening and closing movement of the valve relative to its seat.

The type of valve structure just described is provided with various seals as illustrated at 34 and 35 and the body is formed with an outlet port 36.

The valve as described is subject to various mechanical difficulties, particularly as concerns the control of liquid or gas under pressure as it is difficult to obtain a tight metal seat between the valve and the bushing seat. Also in a valve structure of the character disclosed, the valve guide depending from the valve tends to gall or wear the bore of the bushing. Also leakage is liable to occur at the threaded area 8 between the bushing and the body.

I have overcome the difficulties mentioned aforesaid in a simple and expedient manner through the use of a soft plastic insert or liner for the bushing. Referring to FIGURE 3, the bushing is provided with an uniform central bore 40 and an enlarged diameter counter-bore 41 at what I term the base end of the bushing. Within the bores 40 and 41 is received an insert 42. This insert has an uniform diameter axial bore 43, the external surface of the bushing is enlarged in diameter at 44 and externally reduced in diameter at 45 so as to conform to and fit tightly within the bore and counter-bore of the bushing. The seat 12 of the bushing and the seat angle for the insert are substantially the same, as shown in FIGURE 4. However, the angle of the conical portion of the valve with respect to the axis thereof is less than the angle for the seat of both the bushing and the insert. In my insert construction, the inlet bore or port portion at 6a has a smaller diameter than the diameter of the counter-bore 41 in the bushing, and the insert and specifically the enlarged diameter portion 44 thereof, has a greater lengthwise dimension than the lengthwise dimension of the counter-bore 41 in the bushing. In assembling the insert within the bushing, the bushing is tightened in the usual manner by turning the same relative to the body through the threaded connection at 8 so that the enlarged protruding end portion of the insert at 46 is compressed against the base wall 47 of the body. Such compression of the insert at this portion provides an effective seal and prevents any leakage at this zone which might cause leakage along the threaded area 8.

Due to the difference in angle between the conical surface of the valve relative to the angle of the bushing seat and insert as illustrated in FIGURE 4, the valve in its closing movement engages the tapered surface of the insert prior to engaging the metal seat of the bushing. Thus a soft sealing engagement is effected between the valve and the insert followed by a seating engagement with the metal seat, as shown in FIGURE 3. The difference in angle between the conical surface of the valve and that of the bushing seat, may vary, between 1 and 5 degrees.

The insert also provides a means whereby sliding movement of the winged stem 32 may be effected without galling or any damage to the wing guides, and provides for low friction movement between these parts.

I have found that various materials are adaptable for use as insert material, and to name a few, I mention: Kel–F which is in the chemical form of chlorotrifluoroethylene, halofluorocarbon polymers, and trifluorochloroethylene; Teflon, a tetrafluoroethylene resin; nylon, which is a polyamide; and Lexan, a poly-carbanate.

The operation uses and advantages of the invention just set forth are as follows:

Quite obviously, an insert must be used which has a lower modulus of elasticity than that of the bushing. When the insert is in place within the bushing, the enlarged diameter end of the insert extends beyond the bushing base with the result that when the bushing is tightened in the valve body, a tight seal is effected between the base of the valve body surrounding the inlet port 6a and the bushing. Thus any leakage of gas or liquid is effectively prevented in a simple manner. By having a different degree of slope between the bushing and the insert from that of the valve seat, the valve upon closing, first contacts the soft seat of the insert to provide a seal. A small spring load downwardly on the valve causes deformation of the insert, it being observed from FIGURE 3 that this insert is tapered to the same slope as the seat of the bushing which forms a small triangular section for the insert and which section is deformed when the valve contacts the same. However, as the insert at this portion does not bear the complete weight or force of the valve, the insert is deformed and seals, whereupon continued movement, which is slight, of the valve will cause engagement thereof with the conical seat of the bushing. As this bushing seat is of hard metal similar to the hard metal valve, any additional downward spring load on the valve is supported by the bushing, and damage to the insert is prevented, such as might occur if the insert supported the entire spring load on the valve. In other words, the insert has a small spring load engagement with the valve while the major portion of the unbalanced spring load is carried by the bushing. Because of this fact, proper and consistent function of the valve is obtained.

I claim:

1. In valve construction, a bushing provided with a conical seat portion, an insert within said bushing and formed with a conical seat portion the conical seat portions of the insert and of the bushing having the same degree of slope to perpendicular, a valve having a conical surface for engagement with the seat of the insert and of the bushing, when moved in one direction, the conical surface of the seat of the bushing and of the insert having a greater degree of slope to perpendicular than that of the conical surface of the valve, whereby the conical surface of the valve compresses the insert to form a seal in advance of engagement with the seat of the bushing, said insert being formed of yieldable plastic material and comprising two cylindrical portions having a uniform diameter bore, the larger diameter portion of which is of greater length when unconfined than the space in the bushing in which it is secured.

2. In valve construction a valve body, a valve axially movable in the valve body and having a conical seat engaging portion, a bushing having two coaxial communicating cylindrical bores and having threaded engagement with the valve body at one end and having a conical valve seat at the other end, an insert of a material of greater resilience than the material of the bushing having a uniform diameter central bore with a conical valve seat at one end, the other end of the insert being of greater outer diameter to fit snugly the larger diameter bore of the bushing and being of greater length when unconfined than the length of the larger diameter bore whereby when the bushing is screwed into the body the larger diameter portion of the insert will be anchored in place and will prevent leakage at the threaded engagement.

3. The construction of claim 2 in which the valve has guide means slidably engaging the bore of the insert, and the conical portion of the valve is steeper than the conical portions of the seats of the insert and the bushing so that the valve engages the seat of the insert before seating on the seat of the bushing, thereby compressing the smaller diameter portion of the insert and preventing leakage when the valve is seated.

4. In a valve structure for control of a fluid under pressure, a valve body having an inlet port and an internally threaded recess adjacent said port, an elongated bushing having threaded engagement with the valve body and having centrally a smooth cylindrical bore enlarged by a counter-bore proximate its inlet end and having a conical valve seat at its other end, a compressible plastic insert firmly anchored in the counter-bore when the bushing is screwed into the valve body to prevent leakage at the threaded engagement and extending from the anchored portion toward the valve seat of the bushing as a thin-walled tube engaging the smaller diameter portion of said smooth cylindrical bore, said tube having a conical valve seat adjacent the valve seat of the bushing, and a valve for engaging the seats having a conical surface steeper than that of the tube seat whereby to engage and compress the insert before making contact with the bushing seat.

References Cited in the file of this patent

UNITED STATES PATENTS

| | | |
|---|---|---|
| 2,163,472 | Shimer | June 20, 1939 |
| 2,196,977 | Campbell | Apr. 16, 1940 |
| 2,223,509 | Brauer | Dec. 3, 1940 |
| 2,297,535 | Bryant | Sept. 29, 1942 |
| 2,369,025 | Cummings | Feb. 6, 1945 |
| 2,784,737 | Kelly | Mar. 12, 1957 |
| 2,875,978 | Kmiecik | Mar. 3, 1959 |
| 2,924,421 | Pohndorf | Feb. 9, 1960 |
| 2,927,767 | Ray | Mar. 8, 1960 |

FOREIGN PATENTS

| | | |
|---|---|---|
| 519,949 | Belgium | Nov. 16, 1953 |
| 842,571 | Germany | 1952 |